United States Patent
Kubo

(10) Patent No.: US 11,656,389 B2
(45) Date of Patent: May 23, 2023

(54) DIFFRACTIVE OPTICAL ELEMENT, OPTICAL APPARATUS USING THE SAME, AND METHOD FOR MANUFACTURING DIFFRACTIVE OPTICAL ELEMENT

(71) Applicant: CANON KABUSHIKI KAISHA, Tokyo (JP)

(72) Inventor: Kazuto Kubo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 563 days.

(21) Appl. No.: 16/532,021

(22) Filed: Aug. 5, 2019

(65) Prior Publication Data
US 2020/0049870 A1 Feb. 13, 2020

(30) Foreign Application Priority Data
Aug. 9, 2018 (JP) .............................. JP2018-150555

(51) Int. Cl.
*G02B 5/18* (2006.01)

(52) U.S. Cl.
CPC ......... *G02B 5/1814* (2013.01); *G02B 5/1838* (2013.01); *G02B 5/1857* (2013.01); *G02B 5/1866* (2013.01); *G02B 5/1809* (2013.01)

(58) Field of Classification Search
CPC .. G02B 5/1814; G02B 5/1823; G02B 5/1866; G02B 5/1871; G02B 5/1876; G02B 5/188; G02B 5/1885; G02B 27/4272
See application file for complete search history.

(56) References Cited

U.S. PATENT DOCUMENTS

| 5,969,864 | A  | * | 10/1999 | Chen | G02B 5/1876 |
|---|---|---|---|---|---|
|  |  |  |  |  | 359/569 |
| 8,649,095 | B2 | * | 2/2014 | Ando | G02B 5/1895 |
|  |  |  |  |  | 359/742 |
| 8,941,923 | B2 | * | 1/2015 | Ushigome | G02B 27/44 |
|  |  |  |  |  | 359/569 |
| 9,400,396 | B2 | * | 7/2016 | Takayama | G02B 27/4272 |
| 2003/0112515 | A1 | * | 6/2003 | Nakabayashi | G02B 5/1866 |
|  |  |  |  |  | 359/566 |

FOREIGN PATENT DOCUMENTS

| JP | 2003315526 A | * | 11/2003 |
|---|---|---|---|
| JP | 2006162822 A | * | 6/2006 |
| WO | 2011-099550 A1 |  | 8/2011 |

\* cited by examiner

*Primary Examiner* — Nicholas R. Pasko

(74) *Attorney, Agent, or Firm* — Canon U.S.A., Inc., IP Division

(57) ABSTRACT

A diffractive optical element includes a substrate, a first resin layer formed on the substrate and having a diffraction grating shape including a plurality of wall surfaces and a plurality of slopes, a second resin layer formed in close contact with the first resin layer, a high refractive-index portion formed on the plurality of wall surfaces of the first resin layer and having a higher refractive index than the first and the second resin layers, and a close contact portion discontinuous with the high refractive-index portion, wherein the close contact portion is formed on the plurality of slopes of the first resin layer, and wherein a thickness of the close contact portion is smaller than a height of the plurality of wall surfaces.

15 Claims, 8 Drawing Sheets

DIFFRACTIVE OPTICAL ELEMENT, OPTICAL APPARATUS USING THE SAME, AND METHOD FOR MANUFACTURING DIFFRACTIVE OPTICAL ELEMENT

BACKGROUND OF THE INVENTION

Field of the Invention

The present disclosure relates to a diffractive optical element used for optical apparatuses, such as still and video cameras. More particularly, the present disclosure relates to a diffractive optical element using two different types of resin having different optical characteristics, an optical apparatus using the same, and a method for manufacturing the diffractive optical element.

Description of the Related Art

A diffractive optical element using two different types of optical members having different optical characteristics is known as a diffractive optical element used as a lens. This diffractive optical element utilizes the characteristics in which chromatic aberration is completely conversely generated between a diffractive optical system and a refractive optical system to restrict chromatic aberration as a lens, and remarkably reduces the size and weight of the entire lens. With the recent improvement in image quality of optical apparatuses, such as still and video cameras, higher levels of optical performance of lenses are required.

For example, a brochure of international publication of WO2011-099550 discusses a technique for providing a high refractive-index member (waveguide) having a higher refractive index than two optical elements on wall surfaces (vertical faces) of a diffractive optical element in order to reduce the generation of flare light resulting from the diffraction grating shape.

However, in a conventional diffractive optical element, the generation of flare light was unable to be reduced after being left in a high-temperature environment for a long period of time.

SUMMARY OF THE INVENTION

According to an aspect of the present disclosure, a diffractive optical element includes a substrate, a first resin layer formed on the substrate and having a diffraction grating shape including a plurality of wall surfaces and a plurality of slopes, a second resin layer formed in close contact with the first resin layer, a high refractive-index portion formed on the plurality of wall surfaces of the first resin layer and having a higher refractive index than the first and the second resin layers, and a close contact portion discontinuous with the high refractive-index portion, wherein the close contact portion is formed on the plurality of slopes of the first resin layer, and wherein a thickness of the close contact portion is smaller than a height of the plurality of wall surfaces.

Further features of the present disclosure will become apparent from the following description of exemplary embodiments with reference to the attached drawings.

DESCRIPTION OF THE EMBODIMENTS

<Diffractive Optical Element>

Figure 1:
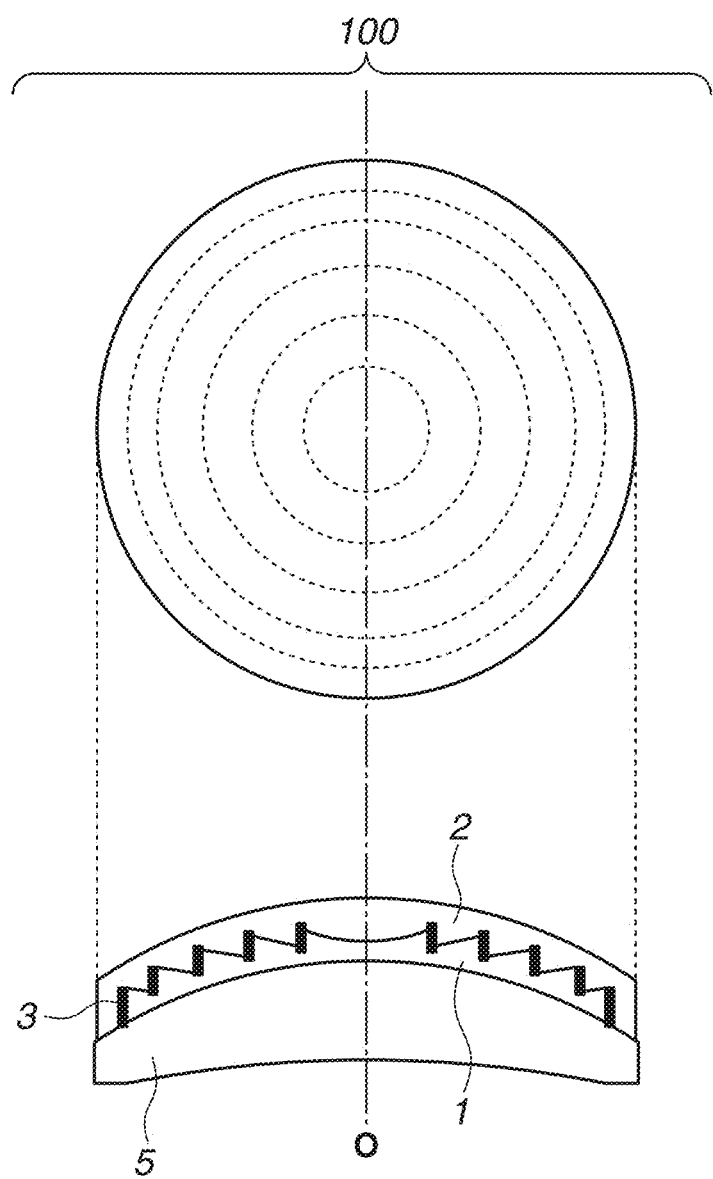
FIG. 1 schematically illustrates a diffractive optical element according to an exemplary embodiment of the present disclosure.
Figure 2:
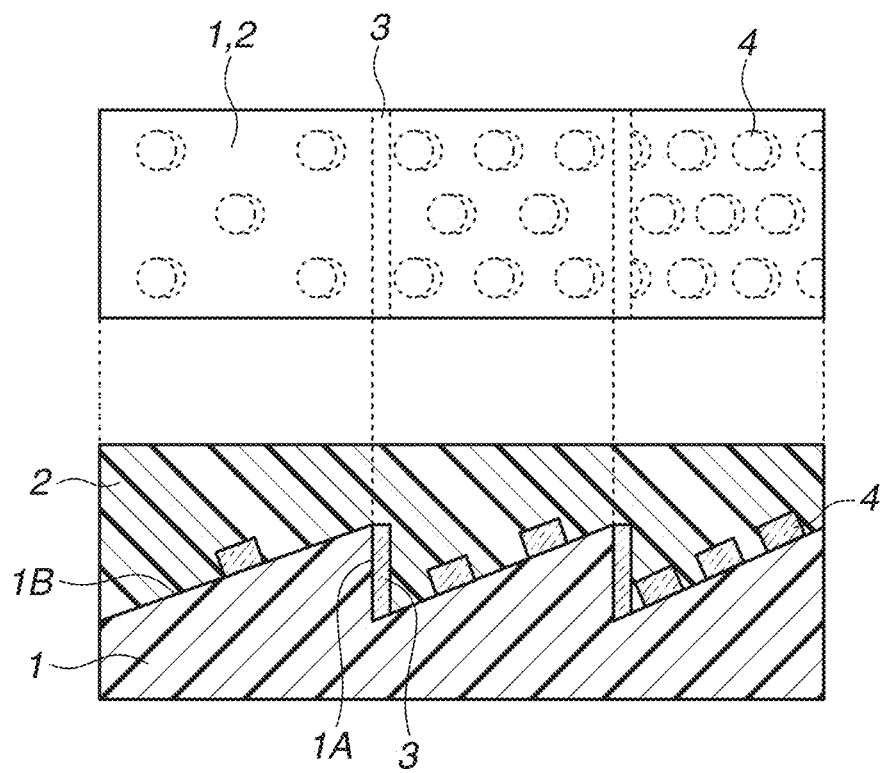
FIG. 2 schematically illustrates the diffractive optical element according to an exemplary embodiment of the present disclosure.

FIG. 1 is a top view and a side view illustrating a diffractive optical element according to an exemplary embodiment of the present disclosure. FIG. 2 is a partial enlarged view illustrating the diffractive optical element illustrated in FIG. 1.

A diffractive optical element 100 is composed of a first resin layer 1 having a diffraction grating shape and a second resin layer 2 stacked in this order in close contact on a first substrate 5. The diffraction grating shape is composed of a plurality of wall surfaces 1A and a plurality of slopes 1B. A high refractive-index portion 3 is formed on the wall surface 1A. The high refractive-index portion 3 has a higher refractive index than the first resin layer 1 and the second resin layer 2.

<Substrate>

The first substrate 5 is a transparent substrate. For example, S-LAH55 (Ohara Inc.) as high-refractive-index low-dispersion glass of the lanthanum system and S-FPL51 (Ohara Inc.) as super-low-dispersion glass can be used. Although, in FIG. 1, the first substrate 5 is a meniscus lens, a planar lens can also be used. In addition, a second substrate may be disposed on the second resin layer 2. Like the first substrate, for example, a transparent substrate can be used as the second substrate.

<Resin Layers>

The first resin layer 1 and the second resin layer 2 are made of, for example, a transparent and colorless resin for optical use. The refractive index and the Abbe number are designed to be able to achieve the desired optical characteristics of the diffractive optical element 100. To achieve a high diffractive efficiency in a wide wavelength band, it is desirable that the first resin layer 1 provides a low refractive index and high dispersion, and the second resin layer 2 provides a high refractive index and low dispersion. Low and high refractive indices mean a relative relation between the refractive indices of the first resin layer 1 and the second resin layer 2. Likewise, high and low dispersions mean a relative relation between the dispersion characteristics (Abbe number νd) of the first resin layer 1 and the second resin layer 2. This means that, when the first resin layer 1 has a refractive index nd1 and an Abbe number ν1, and the second resin layer 2 has a refractive index nd2 and an Abbe number ν2, relations nd1<nd2 and ν1<ν2 are satisfied.

In order to obtain a high diffractive efficiency of 99% or more in the entire visible region, it is desirable that the first resin layer 1 is made of a resin having the linear dispersion characteristics with a small partial dispersion ratio θgF. In order to obtain the linear dispersion characteristics, the resin may contain inorganic oxide fine particles (with an average particle diameter of about 5 to 20 nm). Usable resins include curable resins such as a thermosetting resin and an ultraviolet curable resin. More specifically, an epoxy resin and an acrylic resin are desirable. Examples of usable inorganic oxide fine particles include Sn-doped indium oxide (ITO) and Sb-doped indium oxide (ATO).

The first resin layer 1 has a diffraction grating shape composed of a plurality of wall surfaces 1A and a plurality of slopes 1B. In planar view from the stacking direction, this diffraction grating shape forms a concentric relief pattern composed of a plurality of circles centering on an optical axis O. The grating pitch of the relief pattern is large near the center of the diffractive optical element 100 and decreases with increasing distance toward the outermost edge to generate the converging effect and diverging effect of light. The length of each slope of the diffraction grating is, for example, 100 μm or more and 5 mm or less. The height of each wall surface of the diffraction grating is, for example, 5 μm or more and 40 μm or less.

Like the first resin layer 1, resins usable for the second resin layer 2 include curable resins such as a thermosetting resin and an ultraviolet curable resin. More specifically, an epoxy resin and an acrylic resin are desirable. Examples of usable inorganic oxide fine particles include zirconium dioxide and titanium oxide.

<High Refractive-Index Portion>

A high refractive-index portion 3 is formed on the wall surface 1A of the first resin layer 1 and is made of a material having a higher refractive index than the first resin layer 1 and the second resin layer 2. More specifically, glass and other inorganic materials are can be. Thus, the high refractive-index portion 3 is made of a material having a smaller linear expansion coefficient than the first resin layer 1 and the second resin layer 2. More specifically, one or a plurality of mixtures out of $A_2O_3$, $HfO_2$, $ZrO_2$, $La_2O_3$, and $TiO_2$ are can be used. From the viewpoint of cost reduction, it is desirable to use $Al_2O_3$, La-doped $Al_2O_3$, or Ti-doped $Al_2O_3$. Disposing the high refractive-index portion 3 on the wall surface 1A makes it possible to reduce flare light (particularly grating flare) generated from the wall surface 1A.

It is desirable that the length (parallel to the wall surface 1A) of the high refractive-index portion 3 is the same as the height of the wall surface 1A, for example, 5 μm or more and 40 μm or less. If the length of the high refractive-index portion 3 is smaller than the height of the wall surface 1A, the diffractive efficiency of the diffractive optical element 100 may become insufficient. The length of the high refractive-index portion 3 may be larger than the height of the wall surface 1A, and a part of the high refractive-index portion 3 may be formed on a slope 1B.

The thickness (length in the direction perpendicular to the wall surface 1A) of the high refractive-index portion 3 is, for example, 10 nm or more and 1.0 μm or less. If the thickness is within this range, flare light generated from the wall surface 1A can be efficiently restricted.

<Close Contact Portion>

A close contact portion 4 is formed on the slope 1B of the first resin layer 1. The thickness of the close contact portion 4 (length in the direction perpendicular to the slope 1B) is smaller than the height of the wall surface 1A. If the thickness of the close contact portion 4 formed on the slope 1B is smaller than the height of the wall surface 1A, peeling between the resin layers is unlikely to occur on the slope 1B. This enables offering a diffractive optical element that is unlikely to be affected by dispersion flare. The reason for this phenomenon is as follows. The close contact portion 4 formed on the slope 1B makes the compressive stress concentrated on the high refractive-index portion 3 disperse to also the close contact portion 4, and what is called the anchor effect occurs between the resin layers on the slope 1B. Even if peeling occurs at an end of the wall surface 1A by the compressive stress applied to the end of the high refractive-index portion 3, the anchor effect prevents peeling from progressing toward the slope 1B.

In this case, the thickness of the close contact portion 4 is preferably 1/400 or more and 1/50 or less times the height of the wall surface 1A. More preferably, the thickness is 10 nm or more and 200 nm or less. If the thickness of the close contact portion 4 is less than 10 nm, the concavo-convex shape is too shallow and possibly prevent the anchor effect from occurring. In addition, if stress is applied to the close contact portion 4, the close contact portion 4 may crack since it is thin. On the other hand, if the thickness of the close contact portion 4 exceeds 200 nm, dispersion flare may occur from the close contact portion 4 because of Rayleigh dispersion.

The close contact portion 4 is formed discontinuously with the high refractive-index portion 3 as a different member from the high refractive-index portion 3. If the close contact portion 4 is formed continuously with the high refractive-index portion 3, the compressive stress concentrates on the close contact portion 4, not on both ends of the high refractive-index portion 3, increasing the possibility of the cracking of the close contact portion 4. If the close contact portion 4 cracks, it become impossible to prevent flare light resulting in a degraded diffractive efficiency.

It is desirable that the covering area of the close contact portion 4 to the slope 1B is 5 or more and 99 or less area portions with respect to 100 area portions of the slope 1B. If the covering area is within this range, the compressive stress occurring in the high refractive-index portion 3 provided on the wall surface 1A and the compressive stress occurring on the close contact portion 4 can be mutually moved and dispersed. This enables increasing the probability of restricting peeling occurring in the interface between the first resin layer 1 and the second resin layer 2. On the other hand, if the covering area is less than 5 area portions, the compressive stress concentrates on the high refractive-index portion 3, and peeling may progress to the slope 1B.

Figure 3:
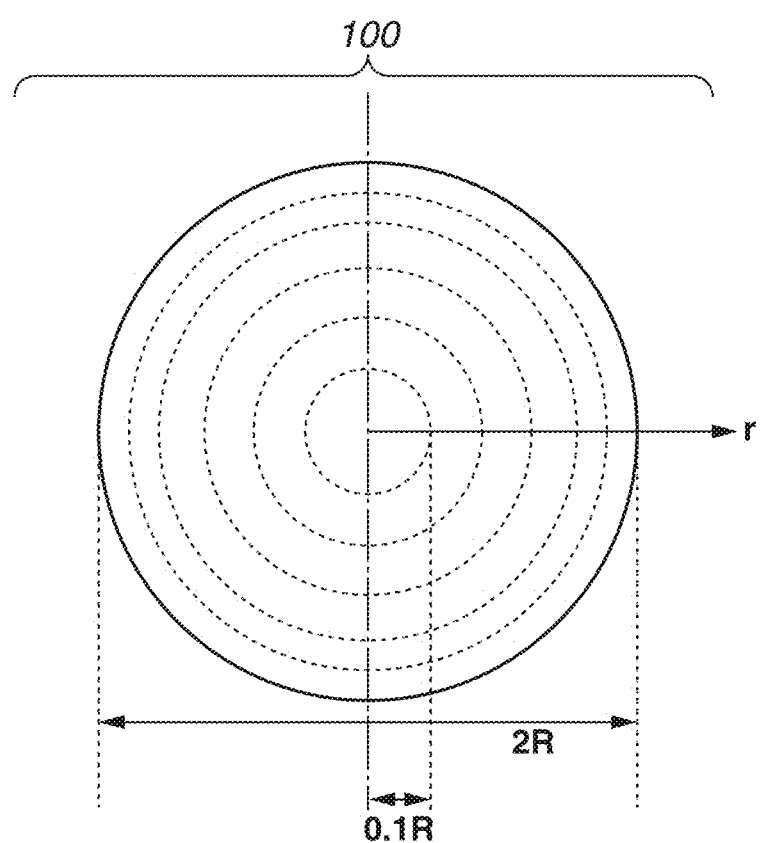
FIG. 3 schematically illustrates the diffractive optical element according to an exemplary embodiment of the present disclosure.

It is desirable that the close contact portion 4 is disposed in a region satisfying a condition $0.1R \leq |r| \leq R$, where R denotes the radius of the diffractive optical element 100 and r denotes the distance from a center O (corresponding to optical axis O) of the diffractive optical element 100 in the outer edge direction (radial direction) when the diffractive optical element 100 is viewed (planar view) from the stacking direction (refer to FIG. 3). This is because, if the close contact portion 4 is not disposed within the range from the center of the diffractive optical element 100 to 0.1R, the transmitted wave front of the diffractive optical element 100 can be made preferable. In a region near the outermost edge of the diffractive optical element 100, the small pitch interval between gratings may cause the interference and synergistic effect between the stresses of adjoining high refractive-index portions 3. In a range from the center of the diffractive optical element 100 to less than 0.1R, the pitch interval between gratings is large enough. Therefore, in a range from the center of the diffractive optical element 100 to less than 0.1R, the probability that peeling occurs is low even if the close contact portion 4 is not provided.

It is desirable that the thickness of the close contact portion 4 increases with increasing distance from the center toward the outer edge of the diffractive optical element 100. It is also desirable that the covering area of the close contact portion 4 to the slope 1B increases with increasing distance from the center toward the outer edge of the diffractive optical element 100. The synergistic effect of the stress occurring from adjoining high refractive-index portions 3 increases with increasing distance from the center toward the outer edge (having a smaller grating pitch) of the diffractive optical element 100. Therefore, increasing the thickness and the covering area of the close contact portion 4 with increasing distance from the center toward the outer edge of the diffractive optical element 100 enhances the anchor effect, providing a structure more resistant to peeling.

It is desirable that the close contact portion 4 forms sea-island structures as illustrated in FIG. 2 on the slope 1B. This is because, even with the same covering area, forming sea-island structures expands concavo-convex regions and makes it possible to enhance the anchor effect compared to the uniform covering state. Referring to FIG. 2, sea-island structures are formed with the close contact portion 4 as islands and the slope 1B as the sea.

The material of the close contact portion 4 is not particularly limited as long as the material is transparent and provides a sufficient close contact between the first resin layer 1 and the second resin layer 2. However, it is desirable that the material has a close refractive index to the first resin layer 1 and the second resin layer 2 in order to obtain a high diffractive efficiency.

It is desirable that the material of the close contact portion 4 is the same as the material of the high refractive-index portion 3. This makes it easier to simultaneously form the close contact portion 4 and the high refractive-index portion 3, thus reducing the manufacturing cost.

It is desirable that the linear expansion coefficient of the close contact portion 4 at 0 to 40° C. is 1/10 times the linear expansion coefficient of the first resin layer 1 and the second resin layer 2 at 0 to 40° C. This is because, if the linear expansion coefficient is 1/10 or less times, i.e., an excessively large difference between the linear expansion coefficients of the close contact portion 4 and the resin layers (first resin layer 1 and second resin layer 2) may possibly cause peeling in the interface between the close contact portion 4 and the resin layers.

In addition, the higher the material affinity between the close contact portion 4 and the resin layers (first resin layer 1 and second resin layer 2), the more intensively the anchor effect occurs. For example, if a hydroxyl group exists on the surface of the close contact portion 4, a hydroxyl group strongly bonded by the hydrogen bond also exists in the first resin layer 1 and the second resin layer 2. Accordingly, it can be expected that the anchor effect is enhanced.

Although the close contact portion 4 is cylindrically shaped as illustrated in FIG. 2, the shape of the close contact portion 4 is not be limited thereto and may be a polygonal column, polygonal pyramid, or cone.

<Diffractive Optical Element by Conventional Technique>

Figure 8:
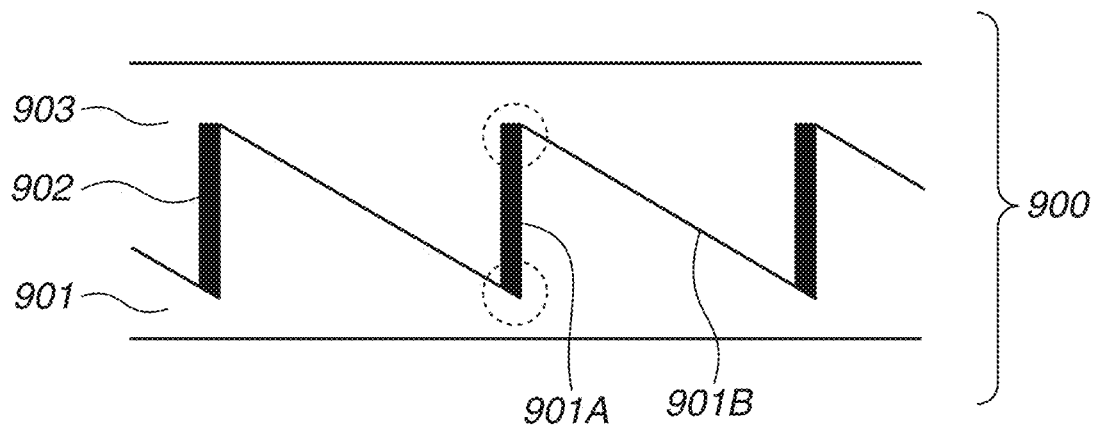
FIG. 8 schematically illustrates a diffractive optical element according to a conventional technique.

FIG. 8 schematically illustrates a diffractive optical element by the conventional technique. A diffractive optical element 900 includes an optical element 901 having a diffraction grating shape composed of a plurality of wall surfaces 901A and a plurality of slopes 901B, a high refractive-index member 902 disposed on the wall surfaces 901A, and an optical element 903. The high refractive-index member 902 is designed to have a higher refractive index than the optical elements 901 and 903. Thus, for example, the high refractive-index member 902 is made of an inorganic material, and the optical elements 901 and 903 are made of an organic material. Since the linear expansion coefficient of organic materials is generally larger than the linear expansion coefficient of inorganic materials, the linear expansion coefficient of the optical elements 901 and 903 is larger than the linear expansion coefficient of the high refractive-index member 902. Accordingly, under a high-temperature environment, the optical elements 901 and 903 expand more than the high refractive-index member 902, and the compressive stress is applied to both ends of the high refractive-index member 902 (portions enclosed in dotted lines illustrated in FIG. 8) from the optical elements 901 and 903. As a result, starting from both ends of the high refractive-index member 902, peeling occurs over the entire interface between the optical elements 901 and 903 in the vicinity of the slopes 901B. Therefore, under a high-temperature environment, the generation of flare light was unable to be reduced even if the high refractive-index member 902 is used.

<Method of Manufacturing Diffractive Optical Element>

A method for manufacturing the diffractive optical element according to the present disclosure will be described below.

FIGS. 4A to 4E schematically illustrate a method for manufacturing the diffractive optical element according to an exemplary embodiment of the present disclosure.

Figure 4A:
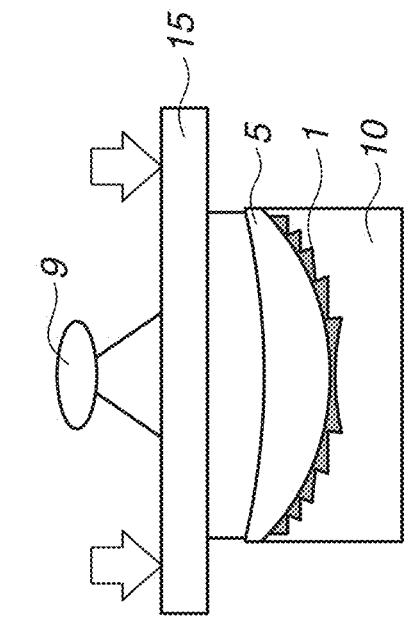
FIGS. 4A, 4B, 4C, 4D, and 4E schematically illustrate a method for manufacturing the diffractive optical element according to an exemplary embodiment of the present disclosure.

As illustrated in FIG. 4A, a first resin 11 as a precursor of the first resin layer is formed between a first substrate 5 and a mold 10. The mold 10 has an inverted shape of a desired diffraction grating shape and is made of stainless steel (such as SUS material and STAVAX from Bohler Uddeholm AG (BUAG)) or NiP. The first resin 11 is a resin containing a curable resin. The following describes an example where an ultraviolet curable resin is used.

Figure 4B:
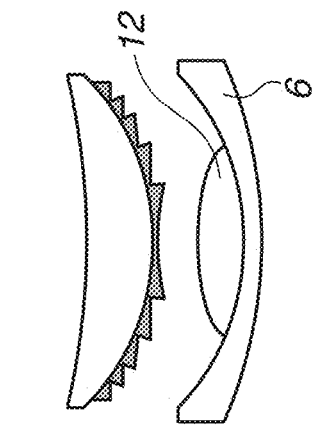

Then, as illustrated in FIG. 4B, the first resin 11 is press-transferred onto the first substrate 5 by using a pressing jig 15 as a transparent substrate made of the same material as the first substrate 5. Subsequently, the first resin 11 is irradiated with ultraviolet radiation from an ultraviolet light source 9 through the pressing jig 15 and the first substrate 5. When the first resin 11 is irradiated with ultraviolet radiation to be cured and then the mold 10 is released, a first resin layer 1 having a diffraction grating shape is formed (this intermediate member is referred to as a lens A).

Figure 4C:
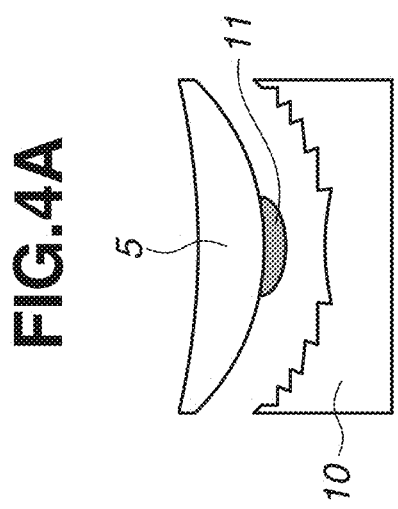

Subsequently, as illustrated in FIG. 4C, a high refractive-index portion 3 is formed on the wall surfaces of the diffraction grating of the lens A by using a vapor deposition method. When the high refractive-index portion 3 is formed using the mask 13, the lens A is tilted by a desired angle with respect to a vapor deposition source 14 and then rotated at a desired speed centering on the optical axis. Then, the high refractive-index portion 3 having a uniform thickness in the circumferential direction is formed.

The close contact portion 4 is formed on the slope of the diffraction grating of the lens A by using the vapor deposition method. Unlike the time of forming the high refractive-index portion 3, the vapor deposition source 14 is disposed perpendicularly to the lens A, and the close contact portion 4 is formed (this intermediate member is referred to as a lens B). In this case, in order not to form the close contact portion 4 on the wall surfaces, a mask is used tailored to the annular interval of the diffraction grating shape. When the same the material is used for the close contact portion 4 and the high refractive-index portion 3, the close contact portion 4 and the high refractive-index portion 3 can be continuously formed. In addition, sea-island structures of the close contact portion 4 can be formed by forming holes having a desired shape on the mask. The thickness of the close contact portion 4 can be made non-uniform by disposing the lens A at an acute angle with respect to the vapor deposition source 14 and rotating the lens A.

Etching may be performed to control the covering area and the thickness of the close contact portion 4. Either dry etching or wet etching may be used. The shape of the close contact portion 4 can be adjusted into a desired shape by changing the ultrasonic wave frequency, temperature, and processing time.

Figure 4D:
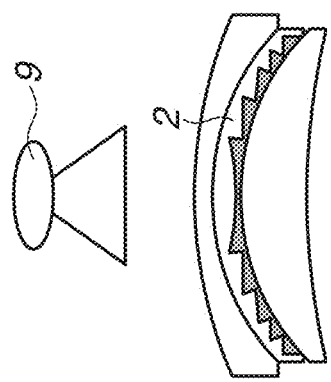

Subsequently, as illustrated in FIG. 4D, in order to form a second resin layer 2 in the lens B, a second resin 12 as a precursor of the second resin layer 2 is formed between the lens B and a second substrate 6. In this case, the second resin 12 is a resin containing a curable resin. Subsequently, the distance between the lens B and the second substrate 6 is adjusted so that the second resin layer 2 provides a desired thickness.

Figure 4E:
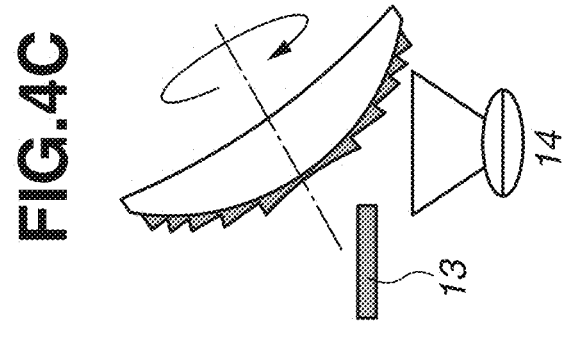

Then, as illustrated in FIG. 4E, the second resin 12 is irradiated with ultraviolet radiation from the ultraviolet light source 9 through the first substrate 5 or the second substrate 6. When the second resin 12 is cured, the second resin layer 2 is formed, and the diffractive optical element according to the present disclosure is obtained. In addition, the second substrate 6 may be removed after forming the second resin layer 2.

<Method for Evaluating Diffractive Optical Element>

A method for evaluating the diffractive optical element according to the present disclosure will be illustrated below.

<Covering Area of Close Contact Portion to Grating Slopes>

The covering area of the close contact portion 4 to the area of the grating slope in each annular of the diffraction grating was calculated through the measurement of the transmitted wave front by using a Fizeau interferometer.

As a result of the measurement of the transmitted wave front on the grating slope having the close contact portion 4 of the diffractive optical element, the phase of the transmitted wave front differs between a region where the close contact portion 4 is present and a region where the close contact portion 4 is absent. More specifically, when the refractive index of the close contact portion 4 is larger than the refractive index of the first resin layer 1 and the second resin layer 2, the phase of the transmitted wave front in a region where the close contact portion 4 is present has a phase lag behind the phase in a region where the close contact portion 4 is absent. On the other hand, when the refractive index of the close contact portion 4 is smaller than the refractive index of the first resin layer 1 and the second resin layer 2, the phase of the transmitted wave front in a region where the close contact portion 4 is present has a phase lead to the phase in a region where the close contact portion 4 is absent.

<Flare Rates>

The flare rate was evaluated before and after a high-temperature durability test (at 60° C. temperature and 70% humidity for 1200 hours).

The diffractive optical element was built in an imaging optical system (EF lens barrel manufactured by Canon, Inc.) modified for flare rate measurement, and flare light in the high refractive-index member was measured. In the flare rate measurement, an image of a blackbody is captured by the imaging optical system incorporating the diffractive optical element to be measured, and then the imaging luminance is evaluated. A larger amount of flare light from the diffractive optical element produces a larger amount of leak light covering the blackbody, resulting in a higher imaging luminance of the blackbody. For quantitative analysis of flare light, the luminance rate of leak light by flare light to a perfect blackbody free from flare light was analyzed. More specifically, the flare rate was defined as the increase rate of the luminance by flare light covering the entire perfect blackbody on the assumption that the luminance of a white screen without blackbody is 100% and the luminance of the perfect blackbody is 0%. The flare rate is desirably 0.15% and more desirably 0.10% or less. The change between the flare rates before and after the high-temperature durability test is desirably less than 0.05% and more preferably 0.02% or less.

<Optical Apparatus>

Next, an optical apparatus according to the present disclosure will be described. The optical apparatus according to the present disclosure includes a housing, and an optical system composed of a plurality of lenses disposed in the housing. At least one of the plurality of lenses is the above-described diffractive optical element.

Figure 5:
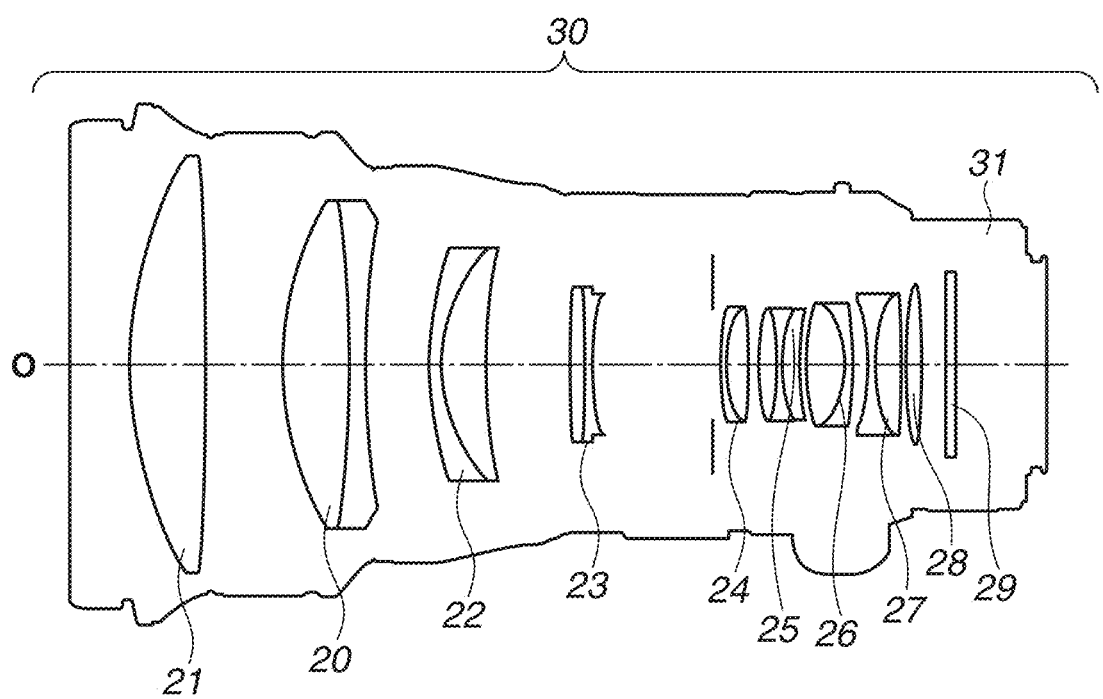
FIG. 5 schematically illustrates an optical apparatus according to an exemplary embodiment of the present disclosure.

FIG. 5 is a cross-sectional view illustrating an optical system of an interchangeable lens barrel of a single-lens reflex camera as an example of a desirable exemplary embodiment of the optical apparatus according to the present disclosure. The optical system of a lens barrel 30 includes lenses 21 to 29 and a diffractive optical element 20 disposed perpendicularly to the optical axis O in a housing 31. The side of the lens 21 is the incidence plane of external light, and the side of the lens 29 is the attachable/detachable mount side with a camera body.

By disposing the diffractive optical element 20 according to the present disclosure at a suitable position of the optical system, an optical apparatus capable of preventing the generation of flare light even under a high-temperature environment can be achieved.

Exemplary Embodiments

The following specifically describes the diffractive optical element according to exemplary embodiments of the present disclosure.

Figure 6:
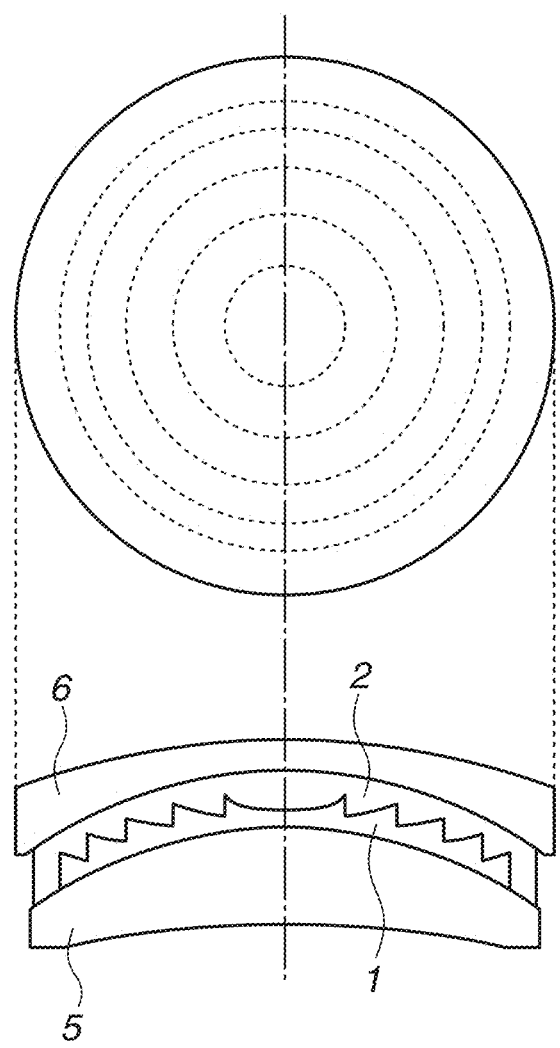
FIG. 6 schematically illustrates the diffractive optical element according to an exemplary embodiment of the present disclosure.

Now, a first exemplary embodiment will be described. A diffractive optical element illustrated in FIG. 6 was manufactured by using the production method described above with reference to FIGS. 4A to 4E.

As the first substrate 5, a glass meniscus lens (with a diameter of 60 mm in planar view) was prepared. As the mold 10, a substrate stainless steel (product name: STAVAX from Bohler Uddeholm AG (BUAG)) as a base material plated with 200-μm NiP and processed into a saw blade cross-sectional shape by using a grinding machine was prepared.

An optically curable epoxy resin as the first resin 11 disposed on the first substrate 5 was press-transferred by using the mold 10. In this state, the first resin 11 was irradiated with ultraviolet radiation through the first substrate 5 so that the resin was cured. In this ultraviolet irradiation, an ultraviolet irradiation apparatus (product name: UV Light Source UL750 from HOYA CANDEO OPTRONICS) was used with a dosage of 15 J/cm2 (with a 15-mW/cm2 illuminance for 1,000 seconds). After completion of the irradiation, when the mold 10 was released, the first resin layer 1 having a concentric diffraction grating shape was formed on the first substrate 5. The obtained diffraction grating shape is formed with a 10-μm height of the wall surfaces and a grating pitch from 0.1 to 3 mm. The grating pitch is the largest in the first annular and decreases with increasing distance toward the 80th annular as the outermost edge. For the first resin layer 1, the refractive-index nd1 was 1.58, the Abbe number ν1 was 32, and the linear expansion coefficient at 0 to 40° C. was $6.2 \times 10^{-5}/°$ C.

Subsequently, to form the high refractive-index portion 3 on the wall surfaces of the diffraction grating shape of the first resin layer 1 and to form the close contact portion 4 on the slopes, alumina ($Al_2O_3$) was deposited through a mask. Vapor deposition conditions for the high refractive-index portion 3 includes an angle of 45 degrees with respect to the vapor deposition source 14, a rotational speed of 5 rpm, and a film forming time of 20 minutes. For the high refractive-index portion 3, the thickness was 200 nm, and the refractive index was 1.75.

Vapor deposition conditions for the close contact portion 4 include an angle of 90 degrees with respect to the vapor deposition source 14, and a film forming time of 15 minutes. The close contact portion 4 was formed at positions from the center of the diffractive optical element 100 to the distance of the radius R. For the close contact portion 4, the thickness was 100 nm (1/100 times the height of the wall surfaces), and the linear expansion coefficient at 0 to 40° C. was $0.8 \times 10^{-5}/°$ C. In addition, the covering area of the grating slope in each annular adjusted with the mask shape was 20 area portions in average.

As the second substrate 6, a concave glass lens was prepared. An optically curable acrylic resin as the second resin 12 between the second substrate 6 and the first resin layer 1 was adjusted so as to achieve a desired thickness. Then, the second resin 12 was irradiated with ultraviolet radiation through the second substrate 6 so that the second resin 12 was cured. Thus, the second resin layer 2 was formed, and the diffractive optical element according to the first exemplary embodiment was obtained. For the second resin layer 2, the refractive-index nd2 was 1.61, the Abbe number ν2 was 41, and the linear expansion coefficient at 0 to 40° C. was $8.4 \times 10^{-5}/°$ C.

Subsequently, the flare rates before and after the high-temperature durability test of the diffractive optical element according to the first exemplary embodiment were evaluated. As a result, the flare rate before the test was 0.03%, and the flare rate after the test was 0.04%. The change amount was 0.01% as a preferable value.

First Comparative Example

A diffractive optical element according to a first comparative example was manufactured by using a similar method to the first exemplary embodiment except that alumina was deposited with the grating slopes masked when the high refractive-index portion 3 and the close contact portion 4 are formed. Therefore, the diffractive optical element according to the first comparative example had no close contact portion.

The flare rates before and after the high-temperature durability test of the diffractive optical element according to the first comparative example were evaluated. As a result, the flare rate before the test was 0.03%, and the flare rate after the test was 0.31%. The change amount was 0.28% as a larger value than the value according to the first exemplary embodiment. After the high-temperature durability test, the interface between the first resin layer 1 and the second resin layer 2 was observed by using an electron microscope. As a result, the occurrence of peeling was confirmed.

Second Comparative Example

A diffractive optical element according to a second comparative example was manufactured by using a similar method to the first exemplary embodiment except that the rotational angle was changed when alumina ($Al_2O_3$) is deposited, and alumina ($Al_2O_3$) was uniformly deposited on the grid wall surfaces and the grating slopes, without forming the close contact portion 4. In other words, for the diffractive optical element according to the second comparative example, the covering area of the grating slopes was 100 area percent. In other words, according to the second comparative example, the close contact portion and the high refractive-index portion were integrally and continuously formed.

For the high refractive-index portion 3, the thickness was 100 nm on the wall surfaces and the slopes, and the refractive index was 1.75.

The flare rates before and after the high-temperature durability test of the diffractive optical element according to the second comparative example were evaluated. As a result, the flare rate before the test was 0.12%, and the flare rate after the test was 0.33%. The change amount was 0.21% as a larger value than the value according to the first exemplary embodiment. After the high-temperature durability test, the interface between the first resin layer 1 and the high refractive-index portion 3 and the interface between the second resin layer 2 and the high refractive-index portion 3 were observed by using an electron microscope. As a result, the occurrence of a crack near the slopes and the occurrence of peeling at the interface between each resin layer and the high refractive-index portion 3 were confirmed.

Next, a second exemplary embodiment will be described. A diffractive optical element according to a second exemplary embodiment was manufactured by using a similar method to the first exemplary embodiment except that the time for depositing alumina was prolonged from that according to the first exemplary embodiment and the mask shape was changed when the high refractive-index portion 3 and the close contact portion 4 are formed and that the rotational angle was changed when the high refractive-index portion 3 is formed.

For the high refractive-index portion 3, the thickness was 300 nm, and the refractive index was 1.75. For the close contact portion 4, the thickness was 200 nm, and the covering area of the grating slope in each annular was 50 area percent on average.

The flare rates before and after the high-temperature durability test of the diffractive optical element according to the second exemplary embodiment were evaluated. As a result, the flare rate before the test was 0.08%, and the flare rate after the test was 0.10%. The change amount was 0.02% as a preferable value.

Figure 7:
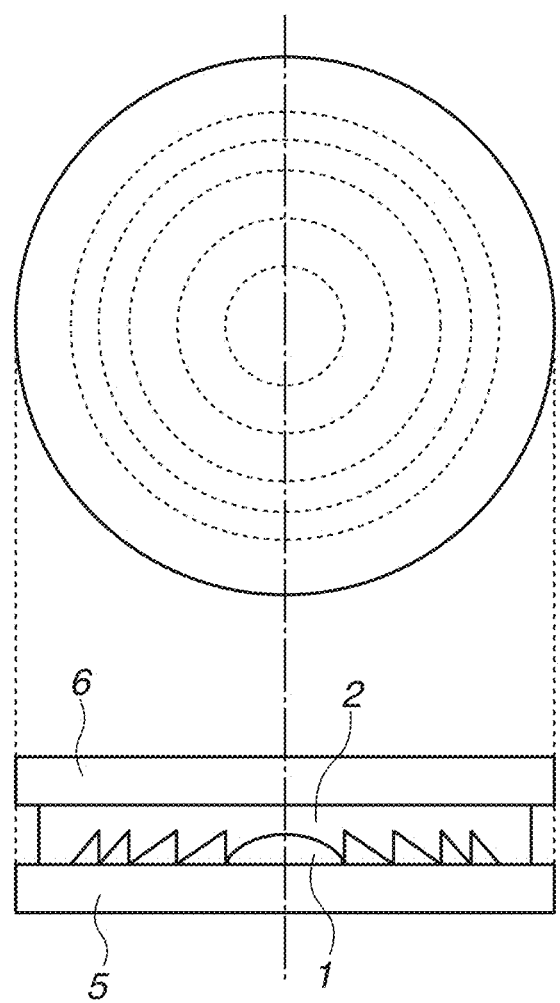
FIG. 7 schematically illustrates the diffractive optical element according to an exemplary embodiment of the present disclosure.

Next, a third exemplary embodiment will be described. A diffractive optical element illustrated in FIG. 7 was manufactured by using the production method described above with reference to FIGS. 4A to 4E.

As the first substrate 5, a glass planar lens (with a diameter of 40 mm in planar view) was prepared. As the mold 10, a substrate stainless steel (product name: STAVAX from Bohler Uddeholm AG (BUAG)) as a base material plated with 200-μm NiP and processed into a saw blade cross-sectional shape by using a grinding machine was prepared.

An optically curable fluorine acrylic resin as the first resin 11 disposed on the first substrate 5 was press-transferred by using the mold 10. In this state, the first resin 11 was irradiated with ultraviolet radiation through the first substrate 5 so as to cure the resin. In this ultraviolet irradiation, an ultraviolet irradiation apparatus (product name: UV Light Source UL750 from HOYA CANDEO OPTRONICS) was used with a dosage of 15 J/cm2 (with a 15-mW/cm2 illuminance for 1,000 seconds). After completion of the irradiation, when the mold 10 was released, the first resin layer 1 having a concentric diffraction grating shape was formed on the first substrate 5. The obtained diffraction grating shape is formed with a 20-μm height of the wall surfaces and a grating pitch from 0.1 to 2 mm. The grating pitch is the largest in the first annular and decreases with increasing distance toward the 35th annular as the outermost edge. For the first resin layer 1, the refractive index was 1.49, the Abbe number v1 was 33, and the linear expansion coefficient at 0 to 40° C. was $7.7 \times 10^{-5}/°$ C.

Subsequently, in order to form the high refractive-index portion 3 on the wall surfaces of the diffraction grating shape of the first resin layer 1, La-added alumina ($La:Al_2O_3$) was deposited via a mask. Vapor deposition conditions for the high refractive-index portion 3 includes an angle of 40 degrees with respect to the vapor deposition source 14, a rotational speed of 8 rpm, and a film forming time of 7 minutes. For the high refractive-index portion 3, the thickness was 120 nm, and the refractive index was 1.71.

Subsequently, in order to form the close contact portion 4 on the grating slopes at positions with a distance r of 4 to 40 mm from the center of the diffraction grating shape, silica ($SiO_2$) was deposited. In this case, a mask (not illustrated) was disposed between the wall surfaces and the vapor deposition source 14 so that silica ($SiO_2$) does not adhere to the wall surfaces. Vapor deposition conditions for the close contact portion 4 include an angle of 90 degrees with respect to the vapor deposition source 14, and a film forming time of 10 minutes. For the close contact portion 4, the thickness was 20 nm ($1/100$ times the height of the wall surfaces), the refractive index was 1.45, and the linear expansion coefficient at 0 to 40° C. was $0.8 \times 10^{-5}/°$ C. The covering area of the grating slope in each annular adjusted with the mask shape was 70 area portions on average.

As the second substrate 6, a glass planar lens was prepared. An optically curable epoxy resin as the second resin 12 between the second substrate 6 and the first resin layer 1 was adjusted so as to achieve a desired thickness. Then, the second resin 12 was irradiated with ultraviolet radiation through the second substrate 6 to cure the second resin 12. In this way, the second resin layer 2 was formed, and the diffractive optical element according to the third exemplary embodiment was obtained. For the second resin layer 2, the refractive index was 1.53, the Abbe number was 39, and the linear expansion coefficient at 0 to 40° C. was $5.9 \times 10^{-5}/°$ C.

The flare rates before and after the high-temperature durability test of the diffractive optical element according to the first exemplary embodiment were evaluated. As a result, the flare rate before the test was 0.05%, and the flare rate after the test was 0.07%. Thus, the change amount was 0.02% as a preferable value.

Next, a fourth exemplary embodiment will be described. The diffractive optical element illustrated in FIG. 1 was manufactured by using the production method described above with reference to FIGS. 4A to 4E.

As the first substrate 5, a glass meniscus lens (with a diameter of 100 mm in planar view) was prepared. As the mold 10, a substrate stainless steel (product name: STAVAX from Bohler Uddeholm AG (BUAG)) as a base material plated with 200-μm NiP and processed into a saw blade cross-sectional shape by using a grinding machine was prepared.

An optically curable acrylic resin containing 16 volume percent of dispersed ITO fine particles as the first resin 11 disposed on the first substrate 5 was press-transferred by using the mold 10. In this state, the first resin 11 was irradiated with ultraviolet radiation through the first substrate 5 to cure the resin. In this ultraviolet irradiation, an ultraviolet irradiation apparatus (product name: UV Light Source UL750 from HOYA CANDEO OPTRONICS) was used with a dosage of 15 J/cm2 (with a 15-mW/cm2 illuminance for 1,000 seconds). After completion of the irradiation, when the mold 10 was released, the first resin layer 1 having a concentric diffraction grating shape was formed on the first substrate 5. The obtained diffraction grating shape is formed with an 8-μm height of the wall surfaces and a grating pitch from 0.1 to 5 mm. The grating pitch is the largest in the first annular and decreases with increasing distance toward the 120th annular as the outermost edge. For the first resin layer 1, the refractive index was 1.62, the Abbe number was 19, and the linear expansion coefficient at 0 to 40° C. was $3.2 \times 10^{-5}/°$ C.

Subsequently, in order to form the high refractive-index portion 3 on the wall surfaces of the diffraction grating shape of the first resin layer 1 and to form the close contact portion 4 on the slopes, Ti-added alumina ($Ti:Al_2O_3$) was deposited via a mask. Vapor deposition conditions for the high refractive-index portion 3 includes an angle of 40 degrees with respect to the vapor deposition source 14, a rotational speed of 10 rpm, and a film forming time of 5 minutes. For the high refractive-index portion 3, the thickness was 80 nm, and the refractive index was 1.81.

Vapor deposition conditions for the close contact portion 4 include an angle of 50 degrees with respect to the vapor deposition source 14, a rotational speed of 6 rpm, and a film forming time of 7 minutes. For the close contact portion 4, the thickness was 20 nm in the first annular and 80 nm in the 117th annular ($1/400$ or more and $1/100$ or less times the height of the wall surfaces). The covering area of the grating slope in each annular adjusted with a mask shape was 5 area portions in the first annular, 99 area portions in the 117th annular, and 100 area portions in the 118th to the 120th annulars. Since the 118th to the 120th annulars are outside the optically effective area, these annulars did not affect the diffractive efficiency. $Ti:Al_2O_3$ formed in the 118th to the 120th annulars is continuous to the high refractive-index portion 3 of the wall surfaces, and therefore is not the close contact portion 4.

As the second substrate 6, a concave glass lens was prepared. An optically curable acrylic resin containing 20 volume % of dispersed zirconia fine particles as the second resin 12 between the second substrate 6 and the first resin layer 1 was adjusted so as to achieve a desired thickness. Then, when the second resin 12 was irradiated with ultraviolet radiation via the second substrate 6 to cure the second resin 12, and thus the second resin layer 2 was formed. Then, the second substrate 6 is removed. Thus, the diffractive optical element according to the fourth exemplary embodiment was obtained. For the second resin layer 2, the refractive-index nd2 was 1.66, the Abbe number v2 was 45, and the linear expansion coefficient at 0 to 40° C. was $2.9 \times 10^{-5}/°$ C.

Subsequently, the flare rates before and after the high-temperature durability test of the diffractive optical element according to the fourth exemplary embodiment were evaluated. As a result, the flare rate before the test was 0.09%, and the flare rate after the test was 0.11%. Thus, the change amount was 0.02% as a preferable value.

The above-described results are summarized in Table 1.

TABLE 1

| | | First exemplary embodiment | First comparative example | Second comparative example | Second exemplary embodiment | Third exemplary embodiment | Fourth exemplary embodiment |
|---|---|---|---|---|---|---|---|
| Substrate | Diameter (mm) | 60 | 60 | 60 | 60 | 40 | 100 |
| First resin layer | Material | Epoxy resin | Epoxy resin | Epoxy resin | Epoxy resin | Acrylic resin | Acrylic resin containing ITO |
| | Height of grid wall surfaces (μm) | 10 | 10 | 10 | 10 | 20 | 8 |
| | Grating pitch (mm) | 0.1-3 | 0.1-3 | 0.1-3 | 0.1-3 | 0.1-2 | 0.1-5 |
| | Refractive index nd1 | 1.58 | 1.58 | 1.58 | 1.58 | 1.49 | 1.62 |
| | Abbe number v1 | 32 | 32 | 32 | 32 | 33 | 19 |
| | Linear expansion coefficient | $6.2 \times 10^{-5}$ | $6.2 \times 10^{-5}$ | $6.2 \times 10^{-5}$ | $6.2 \times 10^{-5}$ | $7.7 \times 10^{-5}$ | $3.2 \times 10^{-5}$ |
| Second resin layer | Material | Acrylic resin | Acrylic resin | Acrylic resin | Acrylic resin | Epoxy resin | Acrylic resin containing zirconia |
| | Refractive index nd2 | 1.61 | 1.61 | 1.61 | 1.61 | 1.53 | 1.66 |
| | Abbe number v2 | 41 | 41 | 41 | 41 | 39 | 45 |
| | Linear expansion coefficient | $8.4 \times 10^{-5}$ | $8.4 \times 10^{-5}$ | $8.4 \times 10^{-5}$ | $8.4 \times 10^{-5}$ | $5.9 \times 10^{-5}$ | $2.9 \times 10^{-5}$ |
| High refractive-index portion | Material | $Al_2O_3$ | $Al_2O_3$ | $Al_2O_3$ | $Al_2O_3$ | $La:Al_2O_3$ | $Ti:Al_2O_3$ |
| | Thickness (nm) | 200 | 200 | 200 | 300 | 120 | 80 |
| | Refractive index | 1.75 | 1.75 | 1.75 | 1.75 | 1.71 | 1.81 |
| Close contact portion | Material | $Al_2O_3$ | None | $Al_2O_3$ | $Al_2O_3$ | $SiO_2$ | $Ti:Al_2O_3$ |
| | Thickness (nm) | 100 | | 100 | 200 | 20 | 20-80 |
| | Thickness (to wall surface) | 1/100 | | 1/100 | 1/50 | 1/100 | 1/400-1/100 |
| | Covering area (area portion) | 20 | | 100 | 50 | 70 | 5-99 |
| | Range | 0-R | | 0-R | 0-R | 0.1R-R | 0-0.98R |
| | Linear expansion coefficient | $0.8 \times 10^{-5}$ | | $0.8 \times 10^{-5}$ | $0.8 \times 10^{-5}$ | $0.8 \times 10^{-5}$ | $1.5 \times 10^{-5}$ |
| Diffractive optical element | Flare rate before test (%) | 0.03 | 0.03 | 0.12 | 0.08 | 0.05 | 0.09 |
| | Flare rate after test (%) | 0.04 | 0.31 | 0.33 | 0.1 | 0.07 | 0.11 |
| | Flare change rate (%) | 0.01 | 0.28 | 0.21 | 0.02 | 0.02 | 0.02 |

Based on the above-described results, it turned out that, before and after the high-temperature durability test, the first to the fourth exemplary embodiments in which the close contact portion having a thickness smaller than the height of the wall surfaces is disposed on the slopes can achieve flare rates lower than those according to the first and the second comparative examples.

According to the present disclosure, it is possible to offer a diffractive optical element with reduced generation of flare light, capable of preventing the occurrence of peeling in the interface between the first and the second resin layers even after being neglected in a high-temperature environment for a prolonged period of time.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-150555, filed Aug. 9, 2018, which is hereby incorporated by reference herein in its entirety.

What is claimed is:

1. A diffractive optical element comprising:
 a substrate;
 a first resin layer formed on the substrate and having a diffraction grating shape including a plurality of wall surfaces and a plurality of slopes;
 a second resin layer formed on the first resin layer;
 a first portion formed on the plurality of wall surfaces of the first resin layer and having a higher refractive index than the first and the second resin layers; and
 a second portion discontinuous with the first portion and the plurality of wall surfaces,
 wherein the second portion is formed on the plurality of slopes of the first resin layer,
 wherein a thickness of the second portion in a direction normal to a surface of the plurality of slopes is smaller than a height of the plurality of wall surfaces,
 wherein a length of the first portion parallel to the plurality of wall surfaces is the same as or larger than the height of the plurality of wall surfaces, and
 wherein the thickness of the first portion in a direction normal to the plurality of wall surfaces is greater than the thickness of the second portion.

2. The diffractive optical element according to claim 1, wherein the thickness of the second portion is 1/400 or more and 1/50 or less times the height of the plurality of wall surfaces.

3. The diffractive optical element according to claim 1, wherein the thickness of the second portion is 10 nm or more and 200 nm or less.

4. The diffractive optical element according to claim 1, further comprising a center and an outer edge, wherein the thickness of the second portion increases with increasing distance from the center toward the outer edge.

5. The diffractive optical element according to claim 1, wherein a covering area of the second portion to the plurality of slopes is 5 or more and 99 or less area portions with respect to 100 area portions on the plurality of slopes.

6. The diffractive optical element according to claim 1, further comprising a center and an outer edge, wherein a covering area of the second portion to the plurality of slopes increases with increasing distance from the center toward the outer edge.

7. The diffractive optical element according to claim 1, further comprising a center and an outer edge, wherein, in a planar view of the diffractive optical element viewed from the direction in which the first and the second resin layers are stacked, the second portion is formed on the plurality of slopes in a region satisfying the formula (1):

$$0.1R \leq |r| \leq R \quad (1)$$

where R denotes a radius of the diffractive optical element, and r denotes a distance from the center toward the outer edge.

8. The diffractive optical element according to claim 1, wherein the second portion is made of an inorganic material.

9. The diffractive optical element according to claim 1, wherein the first portion is made of an inorganic material.

10. The diffractive optical element according to claim 1, wherein the second portion is made of a same material as the first portion.

11. The diffractive optical element according to claim 1, wherein a linear expansion coefficient of the second portion at 0 to 40° C. is 1/10 or more times the linear expansion coefficient of the first and the second resin layers at 0 to 40° C.

12. The diffractive optical element according to claim 1, wherein nd1<nd2 and v1<v2 are satisfied, where nd1 denotes the refractive index of the first resin layer, v1 denotes the Abbe number of the first resin layer, nd2 denotes the refractive index of the second resin layer, and v2 denotes the Abbe number of the second resin layer.

13. The diffractive optical element according to claim 1, wherein a second substrate is stacked on the second resin layer.

14. An optical apparatus comprising:
 a housing; and
 an optical system having lenses arranged in the housing, wherein at least one of the lenses is the diffractive optical element according to claim 1.

15. The diffractive optical element according to claim 1, wherein the thickness of the second portion is 10 nm or more and 200 nm or less, and
 wherein the thickness of the first portion is 1.0 μm or less.

* * * * *